(12) United States Patent
Kim

(10) Patent No.: US 7,804,924 B2
(45) Date of Patent: Sep. 28, 2010

(54) SYMBOL TIMING RECOVERY AND BROADCAST RECEIVER USING THE SAME

(75) Inventor: Jae Hyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1250 days.

(21) Appl. No.: 11/002,873

(22) Filed: Dec. 1, 2004

(65) Prior Publication Data

US 2005/0141660 A1 Jun. 30, 2005

(30) Foreign Application Priority Data

Dec. 1, 2003 (KR) .................... 10-2003-0086430

(51) Int. Cl.
   *H04L 7/00* (2006.01)
(52) U.S. Cl. ....................... 375/355; 375/354
(58) Field of Classification Search .............. 375/355, 375/354; 327/141; 358/409; 370/503; 713/400; 714/12
   See application file for complete search history.

(56) References Cited

U.S. PATENT DOCUMENTS 7,349,469 B1* 3/2008 Touzni et al. .............. 375/232

| 2002/0105599 | A1* | 8/2002 | Hong et al. | ......... 348/726 |
|---|---|---|---|---|
| 2002/0145680 | A1* | 10/2002 | Hong | ......... 348/725 |
| 2004/0067039 | A1* | 4/2004 | Jun | ......... 386/1 |
| 2004/0101062 | A1* | 5/2004 | Lindh | ......... 375/261 |
| 2004/0105508 | A1* | 6/2004 | Kim et al. | ......... 375/286 |

* cited by examiner

*Primary Examiner*—David Payne
*Assistant Examiner*—Brian J Stevens
(74) *Attorney, Agent, or Firm*—Lee, Hong, Degerman, Kang & Waimey

(57) ABSTRACT

A timing recovery for recovering a symbol clock using received data is provided. The timing recovery estimates a timing offset in such a way that dispersion constants of received symbols are minimized. Since the dispersion constants do not totally depend on a specific portion of a received signal spectrum, deterioration of the timing recovery performance by fading of a specific frequency component can be prevented. Particularly, the timing offset can be stably captured in a frequency selective fading channel such as a multipath channel.

10 Claims, 14 Drawing Sheets

- DCRM : DC Remove
- MF : Matched Filter
- PED : Phase Error Detector
- DMTED : Disperation Minimization Timing Error Detector …

SYMBOL TIMING RECOVERY AND BROADCAST RECEIVER USING THE SAME

This application claims the benefit of the Korean Application No. 10-2003-0086430 filed on Dec. 1, 2003, which is hereby incorporated by reference.

BACKGROUND OF THE INVENTION

1. Field of the Invention

The present invention relates to a broadcast receiver, and more particularly, to a symbol timing recovery for minimizing a dispersion constant using received data.

2. Discussion of the Related Art

FIG. 1 is a block diagram of a general digital receiver. Referring to FIG. 1, the digital receiver includes an antenna 101, a tuner 102, an analog processor 103, an analog/digital (A/D) converter 104, a phase separator 105, a carrier recovery 106, a symbol timing recovery 107, a channel equalizer 108, a phase tracer 109, a forward error correction (FEC) decoder 110, and an audio/video (A/V) signal processor 111.

In operation, a sky-wave signal received through the antenna 101 is converted into a pass-band signal of an intermediate frequency (IF) by the tuner 102. Subsequently, the converted signal passes through the analog processor 103 consisting of a surface acoustic wave (SAW) filter, an automatic gain controller (AGC), for removal of inter-channel interferences and high frequency components generated from the tuner 102.

The A/D converter converts an analog signal into a digital signal. At this time, if a fixing oscillator is used in the A/D converter 104, an analog signal is converted into a digital signal having a fixed frequency.

The pass-band signal converted into a digital signal at the A/D converter 104 passes through the phase separator 105 and is converted into a complex signal. The complex signal passes through the carrier recovery 106 and is converted into a baseband signal.

The signal lowered down to the baseband through the carrier recovery 106 is inputted to the symbol timing recovery 107 for recovering a symbol clock.

At this time, a reception party should generate the same clock as the clock that has been used upon transmission so as to recover received data. Such a function is performed by the symbol timing recovery 107.

The symbol timing recovery 107 is positioned in a baseband of the digital television (TV) receiver and delivers synchronized symbol data to the channel equalizer at the rear end.

As described above, a signal from the symbol timing recovery 107 is inputted to the channel equalizer 108 and the channel equalizer 108 removes inter-symbol interferences added by a transmission channel. A residual phase of a carrier, not removed by the carrier recovery 106 is corrected by the phase tracer 109.

The signal whose phase is corrected in this manner passes through the FEC decoder 110 where an error generated while passing through a channel is corrected and the signal passing through the FEC decoder 110 is delivered to the A/V signal processor 111.

The A/V signal processor 111 decrypts video and voice signals processed in a moving picture experts group-2 (MPEG-2) and a Dolby audio coding-3 (AC-3) type and allows the signals to be outputted through a monitor and a speaker 200.

A basic construction of the symbol timing recovery 107 among elements of such a digital broadcast receiver is illustrated in FIG. 2.

As illustrated in FIG. 2, the symbol timing recovery 107 includes a resampler 201, a timing error detector 202, a loop filter 203, and numerically Controlled Oscillator (NCO) 204.

In operation, a signal A/D-converted by the A/D converter 104 passes through the phase separator 105 and the carrier recovery 106 and inputted to the resampler 201 of the symbol timing recovery 107. The resampler 201 generates an intermediate value of a signal sampled at the A/D converter 104, thereby outputting a sample whose phase is close to a phase of an actual symbol timing frequency.

Subsequently, an output from the resampler 201 is delivered to a timing error detector 202, where a timing error is extracted by various algorithms. A timing error signal outputted from the timing error detector 202 passes through the loop filter 203 so that a low-band signal component is filtered. A DC output signal of the loop filter 203 is inputted to the NCO 204, which provides a sampling clock depending on the inputted DC.

FIG. 3 is a block diagram of a Gardner-type symbol timing recovery widely adopted in fields of a digital TV (DTV) receiver and digital communication.

Operation of the Gardner-type symbol timing recovery will be described with reference to FIG. 3. First, a complex signal from the carrier recovery is inputted to a resampler 301, which generates a sample having twice larger frequency than the symbol frequency.

A prefilter 302 passes only a real part in a signal outputted from the resampler 301 and prefilters one half point of the symbol frequency to reduce a pattern jitter due to data.

The signal prefiltered by the prefilter 302 is inputted to a Gardner timing error detector 303 (Gardner TED), which detects a timing error from an inputted signal and outputs the timing error to a loop filter 304 at a rear end.

After that, the loop filter 304 passes only a low band signal component in information regarding a timing error inputted from the Gardner TED 303 and outputs the low band signal component to a numerically controlled oscillator (NCO) 305.

The NCO 305 converts an output frequency depending on the low band component of the timing error to generate a control signal for controlling a sampling timing of the resampler 301.

An output of the resampler 301 under control of the control signal generated at the NCO 305 is outputted to the channel equalizer.

Generally, for the symbol timing recovery, it is required that a fast synchronization capture be performed and the symbol frequency be traced with minimum noise after convergence.

For the fast synchronization capture for the big timing offset, an average gain (i.e., S-curve) of the timing error detector should be large and a convergence characteristic of a timing recovery loop should be good.

Particularly, for a fast synchronization capture even for a ghost close to 0 dB, an average gain characteristic of the timing error detector is very important.

As is well known, a convergence characteristic of the Gardner type timing error detector depends on a gain of an upper band edge of a spectrum positioned at a point of one half a symbol frequency. If the upper band edge of the spectrum is seriously faded in a frequency selective channel circumstance, the symbol timing recovery cannot converge, thus the whole system performance is deteriorated.

That is, as illustrated in FIGS. 4A and 4B, an average gain (S-curve) of the timing error detector reaches almost zero for 1 symbol delay 0 degree (phase) 0 dB ghost or 2 symbol delay 180 degree 0 dB ghost where a null is generated in a spectrum that corresponds to one half of the symbol frequency. As described above, if a null is generated in a relevant data edge, the symbol timing recovery has a problem of not being able to capture the timing offset at all.

FIGS. 5A and 5B are graphs illustrating simulation results of a convergence characteristic of the timing recovery loop by ignoring influence of jitter by carrier recovery and forcibly giving an initial timing offset that corresponds to about 0.0001 times the sampling frequency.

Examination of FIGS. 5A and 5B reveals that in case there exists 1 symbol delay 0 degree (phase) 0 dB ghost or 2 symbol delay 180 degree 0 dB ghost where a null is generated, the symbol timing recovery does not converge to the initial timing offset value. Such results are represented because the average gain characteristics (S-curve) of the timing error detector is reflected as it is, by which a problem that the symbol timing recovery cannot capture the timing offset is confirmed again.

To partially compensate for such disadvantages of the Gardner type, a method for normalizing an output of the timing error detector 303 or a method for adjusting a gain is used. Such methods can reduce a convergence time but increases a jitter component after convergence under influence of a noise amplification, thus dose not provide a fundamental solution for a case where a symbol frequency component is seriously faded.

SUMMARY OF THE INVENTION

Accordingly, the present invention is directed to a symbol timing recovery and a broadcast receiver using the same that substantially obviate one or more problems due to limitations and disadvantages of the related art.

An object of the present invention is to provide a symbol timing recovery and a broadcast receiver using the same, which are capable of stably capturing a timing error even in a frequency selective fading channel such as a multi-path channel by having performance of a timing recovery not being dependent on a specific component of a frequency.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided [a timing recovery, which recovers a timing error of a signal inputted to a digital baseband using a constellation distribution of a symbol applying a dispersion constant as a constant modulus (CM) cost function.] a timing recovery, which recovers a timing error of a signal using a constellation distribution of symbols inputted to a digital baseband.

In another aspect of the present invention, the cost function $J(\tau)$ may apply the following equation:

$$J(\tau_k) = E\{(|y_k(\tau_k)|^2 - \gamma_T)^2\}, \quad \gamma_T = \frac{E\{|Sn|^4\}}{E\{|Sn|^2\}}$$

Here, $\tau_k$: timing offset
$y_k(\tau_k)$: output of matching filter
$\gamma_T$: dispersion constant of original symbols
$E\{\cdot\}$: ensemble expectation
$S_n$: original signal of transmitter The dispersion constant may be estimated by changing a timing offset.

The timing offset is changed in such a way that the dispersion constant is reduced.

In further another object of the present invention, there is provided a timing recovery, which includes: a resampler for receiving timing offsets of current symbols for its feedback and controlling a sampling timing of a complex signal inputted from a carrier recovery; a dispersion minimization timing error detector (DMTED) for estimating timing offset information in such a way that a dispersion constant is reduced by changing a timing offset using the sampling-timing controlled signal; a loop filter for filtering only a low band signal component in timing offset information outputted from the DMTED; and a complex oscillator for feeding a control signal for controlling the sampling timing of the resampler back to the resampler, by changing an output frequency depending on the low band signal component of the timing offset information.

A direct current (DC) remover for removing a DC component of a complex signal inputted from the carrier recovery may be further provided to a front end of the resampler.

A transmission filter that has been used for transmitting, at a transmitter, an input signal and a matching filter for matching with a signal whose sampling-timing has been controlled at the resampler may be further provided to a next end of the resampler.

The DMTED may estimate timing offset information using both a real component and an imaginary component of symbols outputted from the matching filter.

The DMTED may estimate timing offset information using only a real component of symbols outputted from the matching filter.

The DMTED may estimate timing offset information capable of reducing dispersion constant by applying the following equation:

$$\tau_{k+1} = \tau_k - \mu(|y_k(\tau_k)|^2 - \gamma)y_k \frac{\partial}{\partial \tau_k} y_k(\tau_k),$$

Here, $\mu$: step size
$\tau_{k+1}, \tau_k$: timing offset
$y_k(\tau_k)$: output of matching filter
$\gamma_T$: dispersion constant of original symbols The DMTED may be configured such that its convergence speed and its mean square error (MSE) in a normal state are determined depending on the step size $\mu$.

The DMTED may be configured such that its convergence speed gets fast and a residual MSE in the normal state is increased as the step size $\mu$ becomes large while its convergence speed gets slow and the residual MSE is reduced as the step size $\mu$ becomes small.

In yet another object of the present invention, there is provided a timing recovery, which includes: a resampler for receiving timing offsets of current symbols for a feedback and controlling a sampling timing of a complex signal inputted from a carrier recovery; a matching filter (MF) at a next end, for matching a transmission filter that has been used in transmitting, at the transmitter, an input signal with a signal that has been sampling-timing controlled at the resampler; a carrier phase recovery (PED) for removing a residual carrier phase offset from an output signal of the MF; a timing error detector (DMTED) for estimating timing offset information in such a way that a dispersion constant is minimized using a signal deprived of the residual carrier phase offset by the PED; a loop filter for filtering only a low-band signal component among timing offset information outputted from DMTED; and a complex oscillator for converting an output frequency depending on a low-band component of the timing offset information to provide, as a feedback, a control signal for controlling a sampling timing of the resampler.

The cost function $J(\tau)$ for reducing the dispersion constant may apply the following equation:

$$J(\tau, \alpha) = E\{(|\text{real}(\alpha r_k(\tau))|^2 - \gamma)^2\} = E\{(|y_i|^2 - \gamma)^2\},$$
$$\gamma = E\{|s|^4\}/E\{|s|^2\}$$

$\alpha = \alpha_i + j\alpha_q$ $r = r_i + jr_q$ $y = y_i + jy_q = (r_i\alpha_i - r_q\alpha_q) + j(r_i\alpha_q + r_q\alpha_i)$ Here, $\tau_k$: timing offset $y_k(\tau_k)$: output of complex multiplier $\gamma_T$: dispersion constant of original signal $E\{\cdot\}$: ensemble expectation Sn: original signal of transmitter The timing error detector may estimate a value a and a timing offset value $\tau$ for minimizing the cost function $J(\tau)$ by applying the following equation:

$$\alpha_{k+1} = \alpha_k - \mu(|y_i|^2 - \gamma)y_i \frac{\partial y_i}{\partial \alpha} = \alpha_k - \mu(|y_i|^2 - \gamma)y_i(r_i - jr_q).$$

$$\tau_{k+1} = \tau_k - \mu(|y_i|^2 - \gamma)y_i \frac{\partial}{\partial \tau_k} y_i$$
$$= \tau_k - \mu(|y_i|^2 - \gamma)y_i\left(\alpha_i \frac{\partial}{\partial \tau_k} r_i - \alpha_q \frac{\partial}{\partial \tau_k} r_q\right),$$

Here, $\mu$: step size $\tau_{k+1}, \tau_k$: timing offset $y_k(\tau_k)$: output of complex multiplier $\gamma_T$: dispersion constant of original signal In another aspect of the present invention, a broadcast receiver includes: an analog processor for tuning a predetermined channel frequency among received sky wave signals, removing iter-channel interferences and a high frequency component generated during the tuning process, and outputting analog pass band signals; an A/D converter for converting analog pass band signals from the analog processor, into digital pass band signals; a carrier recovery for converting the digital pass band signals into digital baseband signals through carrier recovery; a symbol timing recovery having a construction as described in either claim 1 or claim 5; and an A/V signal processor for removing inter-symbol interferences added by a transmission channel and correcting errors in output signals of the symbol timing recovery, then recovering and outputting video and voice signals from the corrected signals.

The symbol timing recovery may correct the timing error using a constant modulus algorithm (CMA).

The symbol timing recovery may correct the timing error by applying a fourth-degree cost function called a dispersion constant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
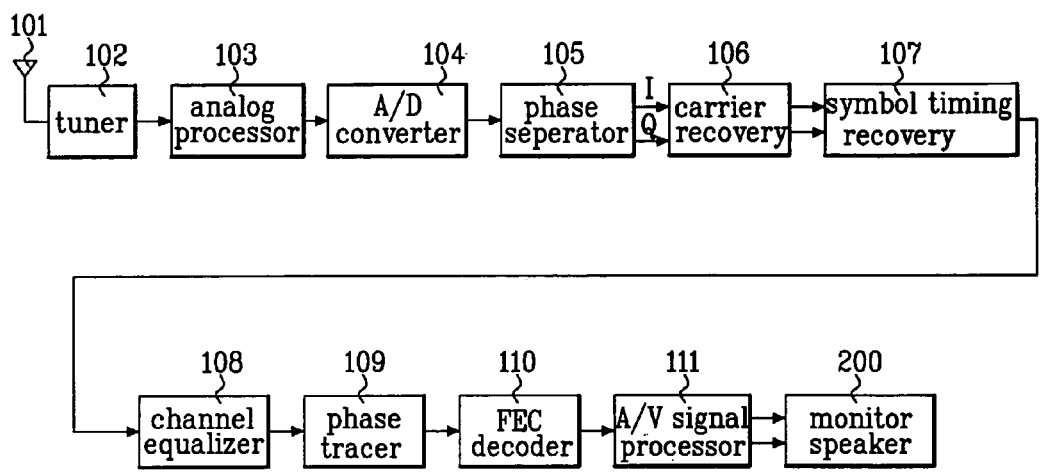
FIG. 1 is a block diagram illustrating a construction of a general digital receiver.
Figure 2:
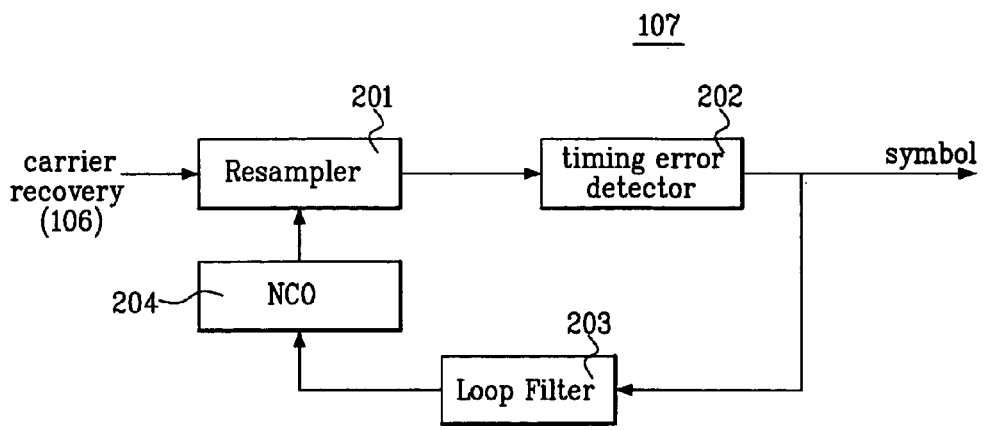
FIG. 2 is a block diagram illustrating a basic construction of the symbol timing recovery.
Figure 3:
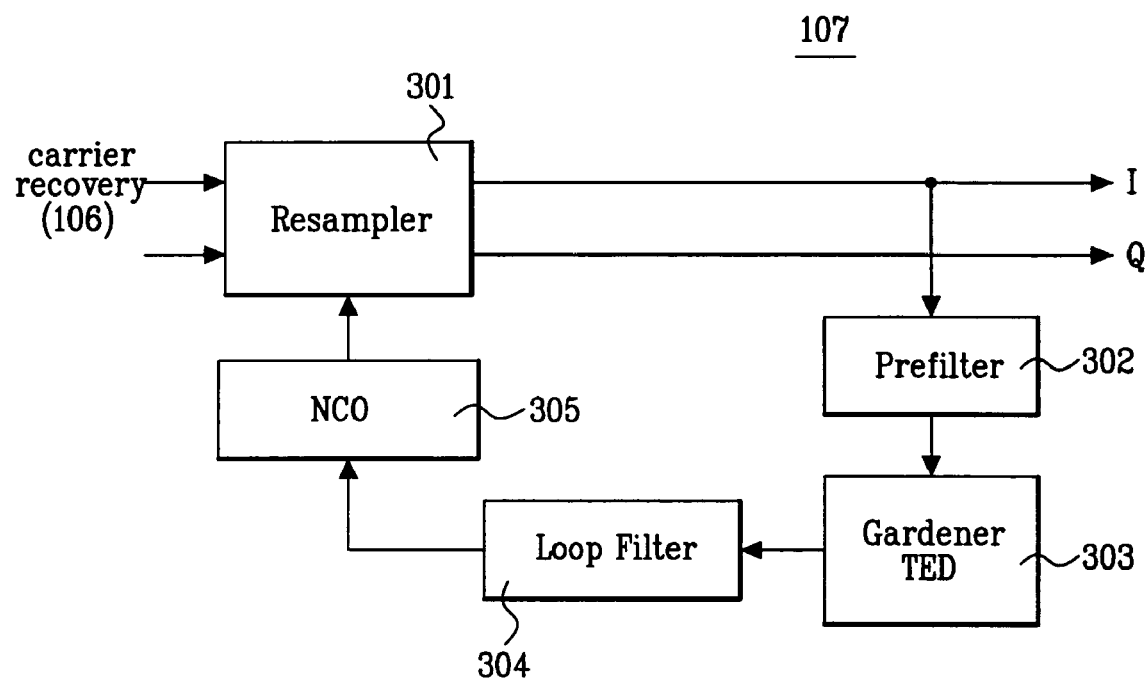
FIG. 3 is a block diagram illustrating a Gardner-type symbol timing recovery.
Figure 4A:
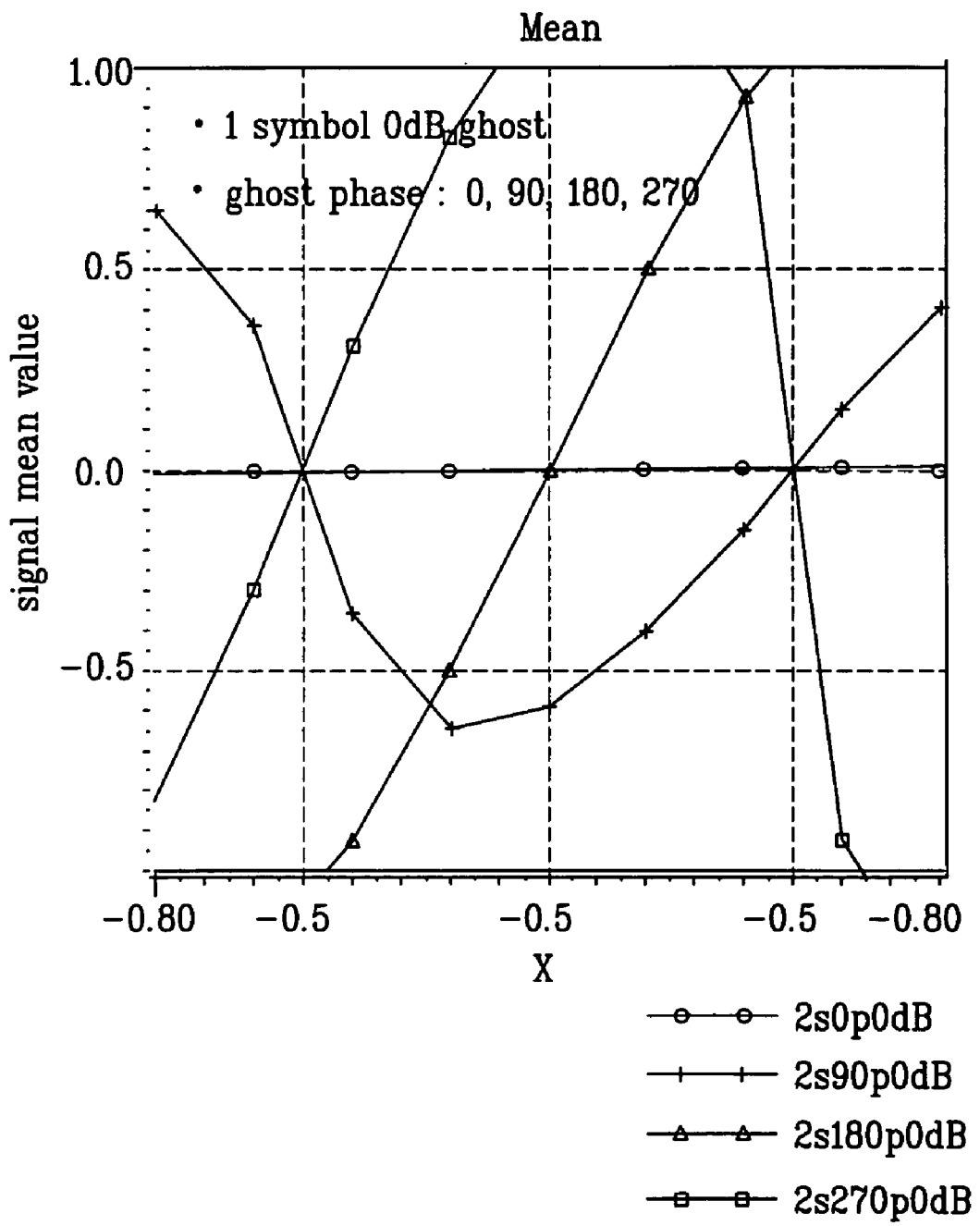
FIGS. 4A and 4B are graphs illustrating an average gain (S-curve) characteristic of a Gardner-type timing error detector.
Figure 4B:
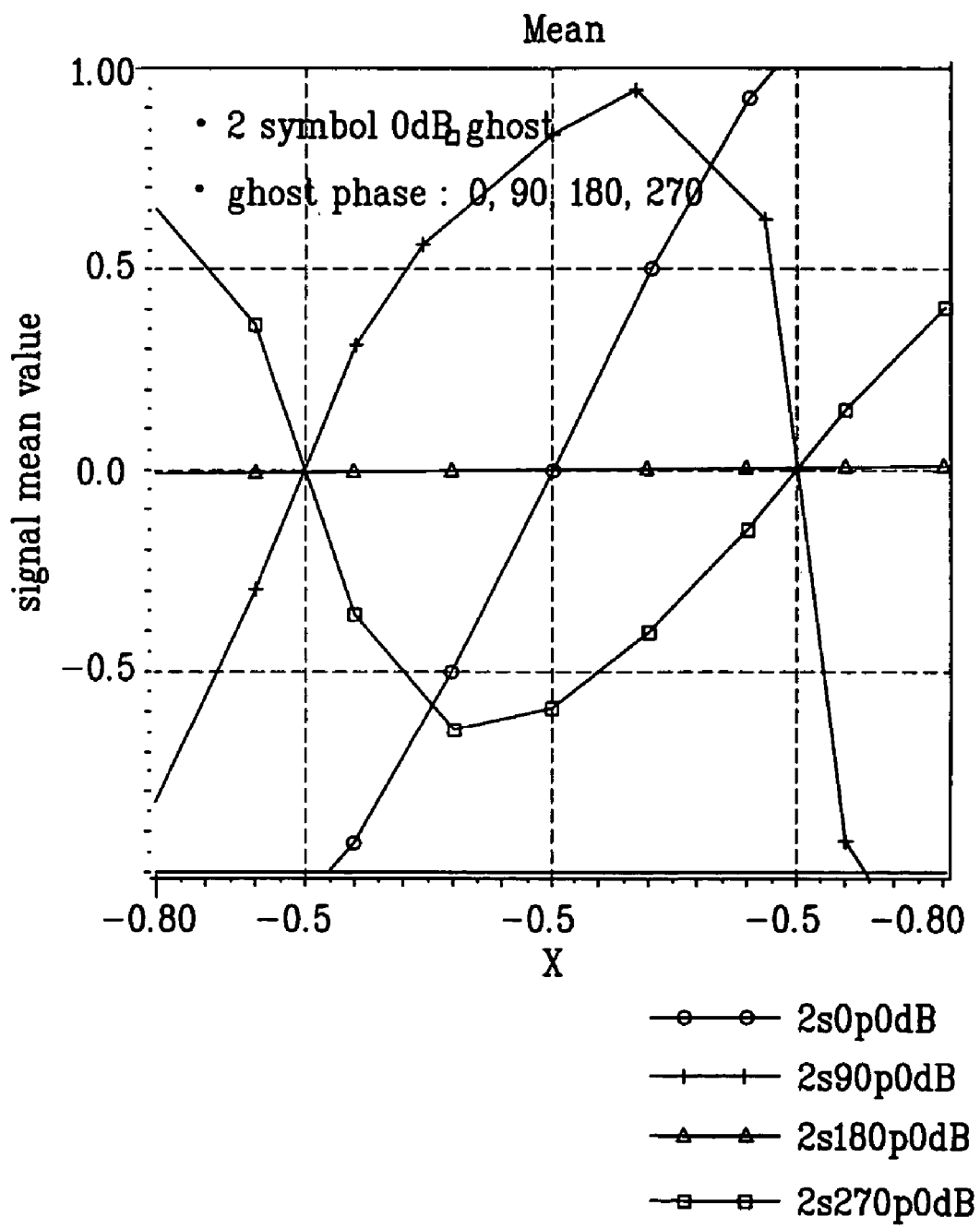
Figure 5A:
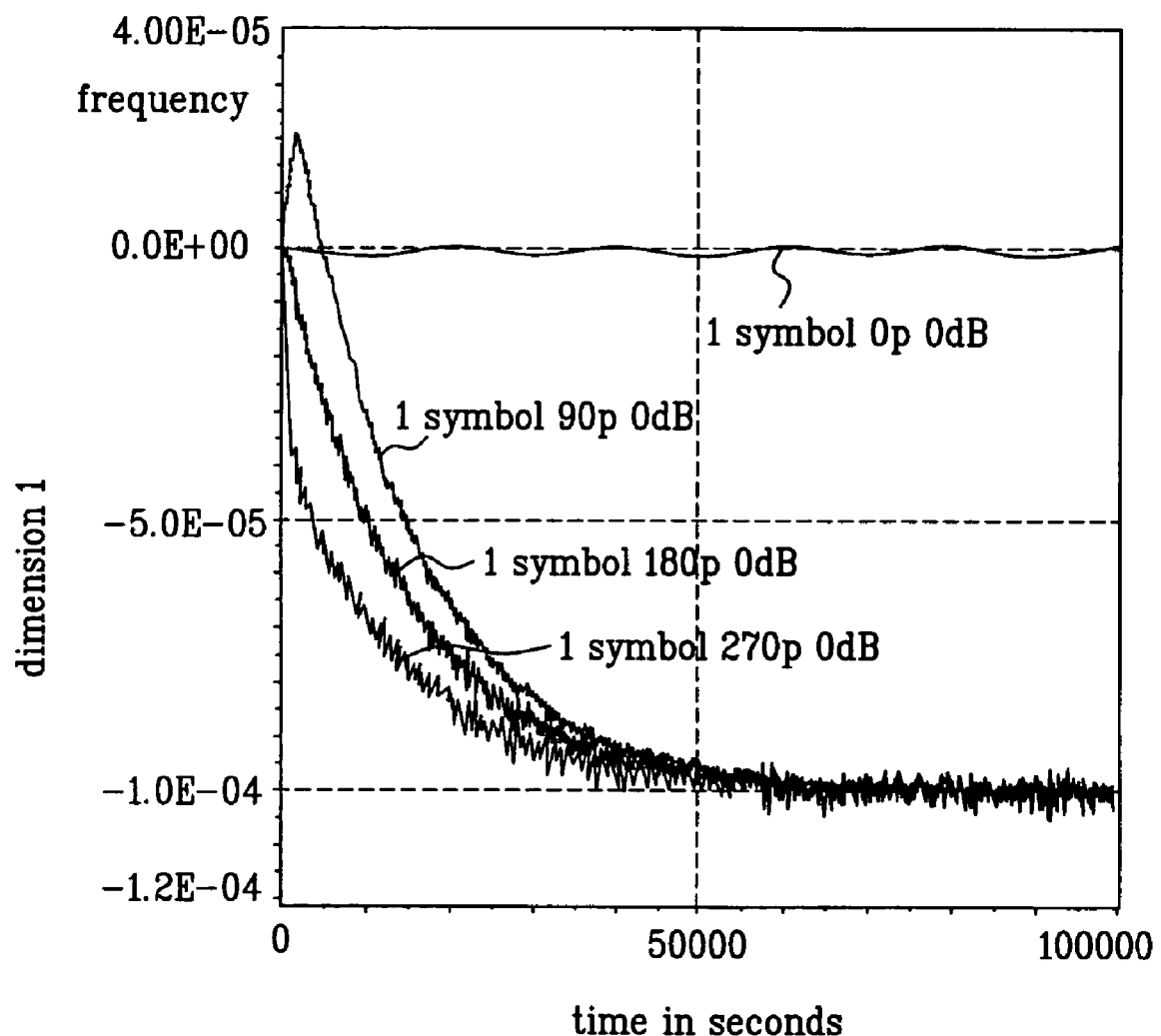
FIGS. 5A and 5B are graphs illustrating simulation results of a convergence characteristic of a Gardner-type timing recovery loop.
Figure 5B:
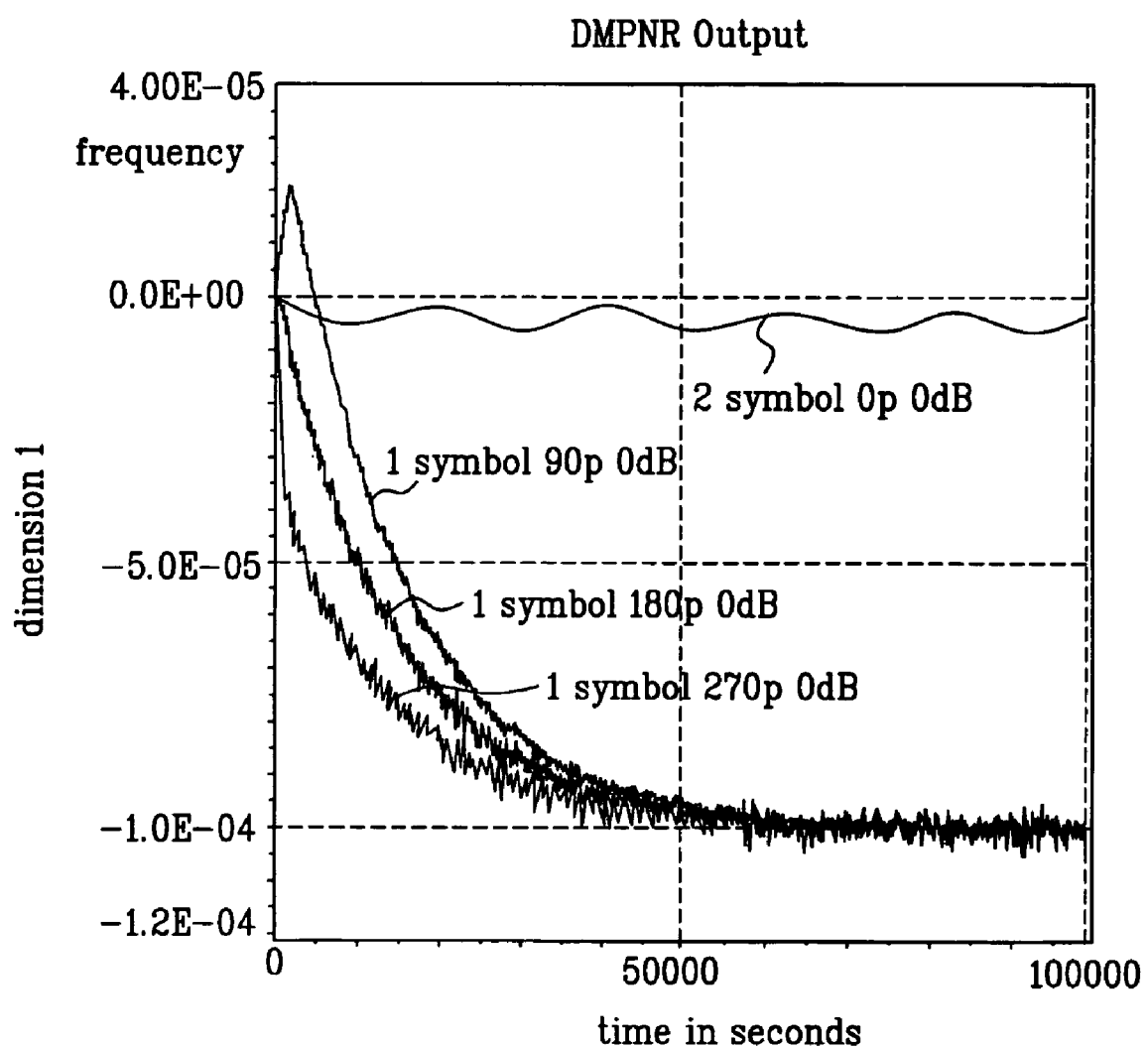

Reference will now be made in detail to the preferred embodiments of the present invention, examples of which are illustrated in the accompanying drawings.

A procedure for computing, at a DMTED of the present invention, a equation of estimating a timing error will be described first in the following before a timing recovery of the present invention is described.

The present invention estimates a timing error using a constant modulus algorithm (CMA).

The CMA, which has been actively developed and is a well-established theory, has been applied to a high definition TV (HDTV) receiver as a blind equalization algorithm since the mid 1990α. The CMA is described in a document by C. Richard Johnson, titled "Blind Equalization Using the Constant Modulus Criterion: A View", Proc. IEEE, Vol. 86, No. 10 October 1998.

The CMA converges to a direction such that a constant modulus (CM) cost function is minimized. At this point, the CM cost function comes to have a big value as a received signal gets far off from sizes or a distribution of original signals.

The present invention is intended to improve a performance of the timing recovery by applying the blind adaptive algorithm to the timing error detector.

Generally, a relation between the adaptive algorithm and a synchronization block is described in a document by Willian A Sethares, titled "An Adaptive View of Synchronization", IEEE Conf, Circuits and Systems MWSCAS2002, Tulsa, Okla. August 2002. An algorithm using a second-degree cost function has been already applied to an output energy maximization (OEM)-type and the Gardner-type symbol timing recovery.

The present invention analyzes a performance of the timing recovery more effectively by applying the fourth-degree cost function called a dispersion constant (DC), not a conventional second-degree cost function, and can be applied to a 8-vestigial sideband (VSB) type HDTV and other communication systems.

First, meaning of a dispersion constant will be described.

Original signals from a transmitter are made from symbols having constellation and these symbols have unique dispersion constants γ.

Presuming that an original symbol is $S_n$, a dispersion constant $\gamma_T$ at a transmitter can be given by the following equation 1:

$$\gamma_T = \frac{E\{|Sn|^4\}}{\sigma_s^2}, \quad \sigma_s^2 = E\{|Sn|^2\} \qquad \text{equation 1}$$

Here, E {•} represents an ensemble expectation.

An 8-VSB system has 8 level signals of ±1, ±3, ±5, ±7 for its transmission symbols and has one-dimensional constellation unlike a quadrature amplitude modulation (QAM) type.

A dispersion constant $\gamma_T$ at a transmitter can be obtained as follows, by inputting the transmission symbol values of the 8-VSB to the equation 1:

$$\gamma_T = \frac{\frac{|-7|^4 + |-5|^4 + |-3|^4 + |-1|^4 + |1|^4 + |3|^4 + |5|^4 + |7|^4}{8}}{\frac{|-7|^2 + |-5|^2 + |-3|^2 + |-1|^2 + |1|^2 + |3|^2 + |5|^2 + |7|^2}{8}} \approx 37$$

Therefore, if a signal received in the receiver is the same as an original signal at the transmitter, constellation of received signals is represented as points and computation values of dispersion constants at the receiver and the transmitter should be identical each other.

However, if received signals at the receiver get hazy under influence of a channel, a dispersion constant at the receiver gets bigger than a dispersion constant at the transmitter.

Figure 6:
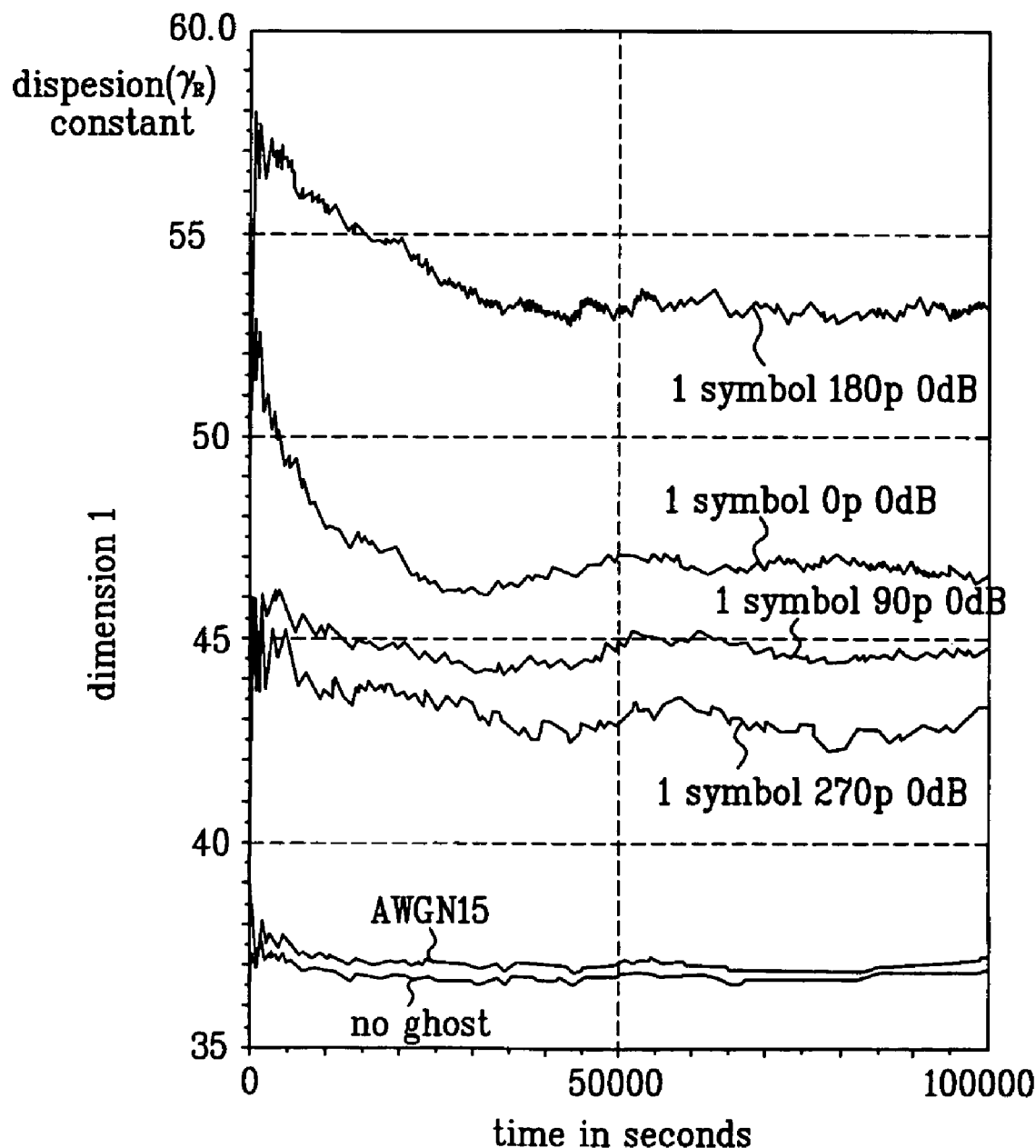
FIG. 6 is a graph illustrating simulation results of a tendency of dispersion constants γR of 8-vestigial sideband (VSB) digital signals which pass through a channel and are received in a receiver.

FIG. 6 is a graph illustrating simulation results of a tendency of dispersion constants $\gamma_R$ of 8-vestigial sideband (VSB) digital signals which pass through a channel and are received in the receiver.

If no ghost is present on a channel, a dispersion constant $\gamma_R$ at the receiver is about 37, which is the same as the dispersion constant $\gamma_T$ of original signals.

Here, $\gamma_R$ represents a dispersion constant at the receiver and $\gamma_T$ represents a dispersion constant at the transmitter, namely, a dispersion constant of original signals.

However, if a signal passes through an additive white Gaussian noise (AWGN) and a single ghost channels, a dispersion constant $\gamma_R$ at the receiver gets larger than a dispersion constant $\gamma_T$ at the transmitter.

That is, in case of the AWGN (where signal-to-noise ratio (SNR) is 15 dB) channel, a dispersion constant is about 37.5, which is an increase of about 0.5. In case of the 1 symbol delay 0 dB ghost channel, dispersion constants are about 47, 45, 53, and 43 for ghost phases 0, 90, 180, and 270 degrees, respectively.

Figure 7:
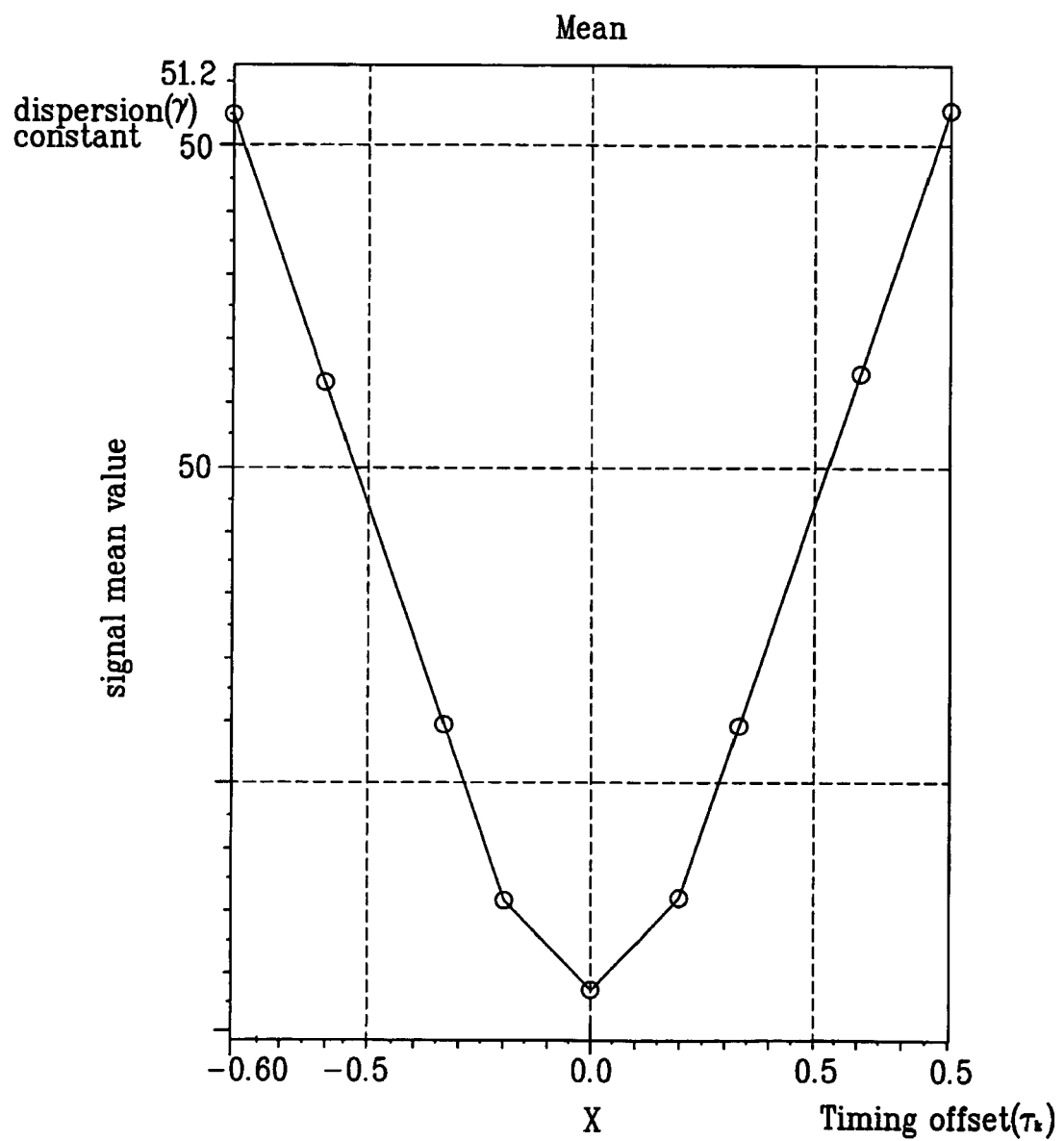
FIG. 7 is a graph illustrating a change tendency of dispersion constant due to a timing offset.

FIG. 7 is a graph illustrating a change tendency of a dispersion constant due to a timing offset, which shows that a constellation of signals gets hazy and a dispersion constant γ increases in case there exists a timing offset $\tau_k$.

In this context, it is possible to estimate parameters necessary for the receiver in such a way that a dispersion constant is used as a cost function and the cost function is minimized.

The present invention applies such a principle to a timing recovery and changes a timing offset, thereby estimating a timing offset in such a way that a dispersion constant $\gamma_R$ at the receiver is minimized.

Presuming that a timing offset is $\tau_k$ and an input signal of the timing error detector is $y_k(\tau_k)$, a cost function J(τ) for minimizing, at the receiver, a dispersion constant $\gamma_R$ is given by the following equation 2:

$$J(\tau) = E\{(|y_k(\tau)|^2 - \gamma_T)^2\}, \quad \gamma_T = \frac{E\{|S_n|^4\}}{E\{|S_n|^2\}} \qquad \text{equation 2}$$

Here, {•} represents an ensemble expectation and $\gamma_T$, $S_n$ represent a dispersion constant at the transmitter, an original signal at the transmitter, respectively.

In the meantime, by applying a stochastic gradient algorithm, a timing offset $\tau_k$ for minimizing a cost function J(τ) can be given by the following equation 3:

$$\tau_{k+1} = \tau_k - \mu(|y_k(\tau_k)|^2 - \gamma)y_k \frac{\partial}{\partial \tau_k} y_k(\tau_k) \qquad \text{equation 3}$$

Here, μ is a step size and determines a convergence speed and an MSE at a normal state.

That is, if a step size μ is big, a convergence speed gets fast but a residual MSE at a normal state gets big. On the contrary, if a step size μ is small, a residual MSE gets small but a convergence speed gets slow.

The present invention provides a DMTED capable of estimating a timing offset using the equation 3 on the basis of the foregoing.

If the timing error detector is constructed in this manner, a dispersion constant $\gamma_R$ at the receiver can be minimized and in this context the timing error detect of the present invention will be named hereinafter as a dispersion minimization timing error detector (DMTED).

In the DMTED of the present invention, a cost function is defined from constellation of a symbols' arrangement, thus in case there exists a DC component in a signal, a totally different result is obtained.

Therefore, a DC remover should precede the timing error detector and a timing error should be detected using a signal that has passed through the matching filter so that a more exact error value can be obtained.

A preferred embodiment of the present invention will now be described with reference to the accompany drawings.

Figure 8:
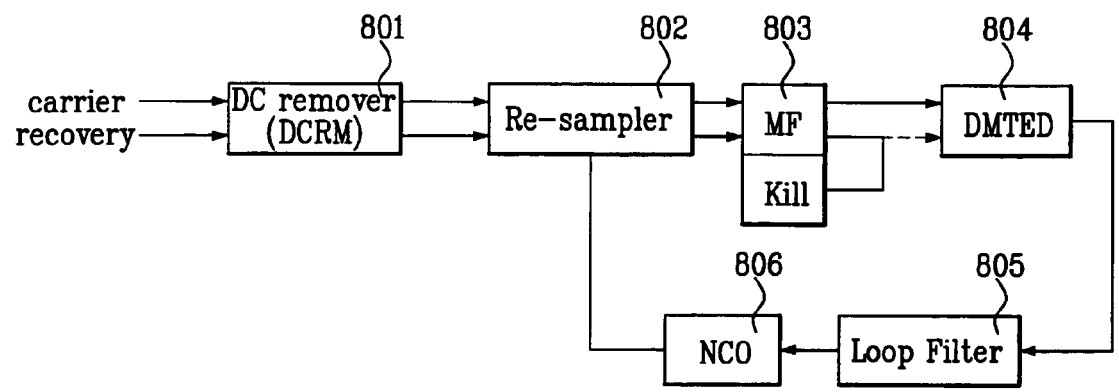
FIG. 8 is a block diagram illustrating a construction of a timing recovery suggested by the present invention.

FIG. 8 is a block diagram illustrating a construction of the symbol timing recovery suggested by the present invention. The symbol timing recovery includes a DC remover 801, a resampler 802, a matching filter (MF) 803, a DMTED 804, a loop filter 805, and an NCO 806.

Operation of the symbol timing recovery will be briefly described in the following. A complex signal from the carrier recovery is deprived of its DC component by the DC remover 801 so that an output characteristic of the DMTED 804 at the rear end may not be changed by the DC component.

The signal whose DC component is removed by the DC remover 801 is inputted to the resampler 802, where samples that correspond to twice the symbol frequency are generated.

The matching filter 803 at the receiver uses a square-root-raised-cosine filter having an excessive bandwidth of $\alpha=-0.35$, which has been used as a transmission filter.

The DMTED 804 estimates a timing offset in such a way that a dispersion constant is minimized, using a signal filtered through the matching filter 803, and outputs the timing offset to a loop filter 805 at the rear end.

At this point, the DMTED 804 may estimate the timing offset using both a real component and an imaginary component of the signal filter by the matching filter 803, or also may estimate the timing offset using only a real component I, ignoring an imaginary component Q.

At this point, since an input signal of the DMTED 804 is the very output signal of the matching filter 803, $y_k( )$ in the equations 2 and 3 correspond to an output signal of the matching filter 803 and the DMTED 804 receives an output signal of the matching filter 803 and $y_k(\tau k)$ to obtain a timing offset meeting the equation 3.

The loop filter 805 passes only a low band signal component among information regarding a timing offset received from the DMTED 804 to output the low band signal component to the NCO 806.

The NCO 806 converts an output frequency depending on the low band component of the timing offset to generate a control signal for controlling a sampling timing of the resampler.

Figure 9A:
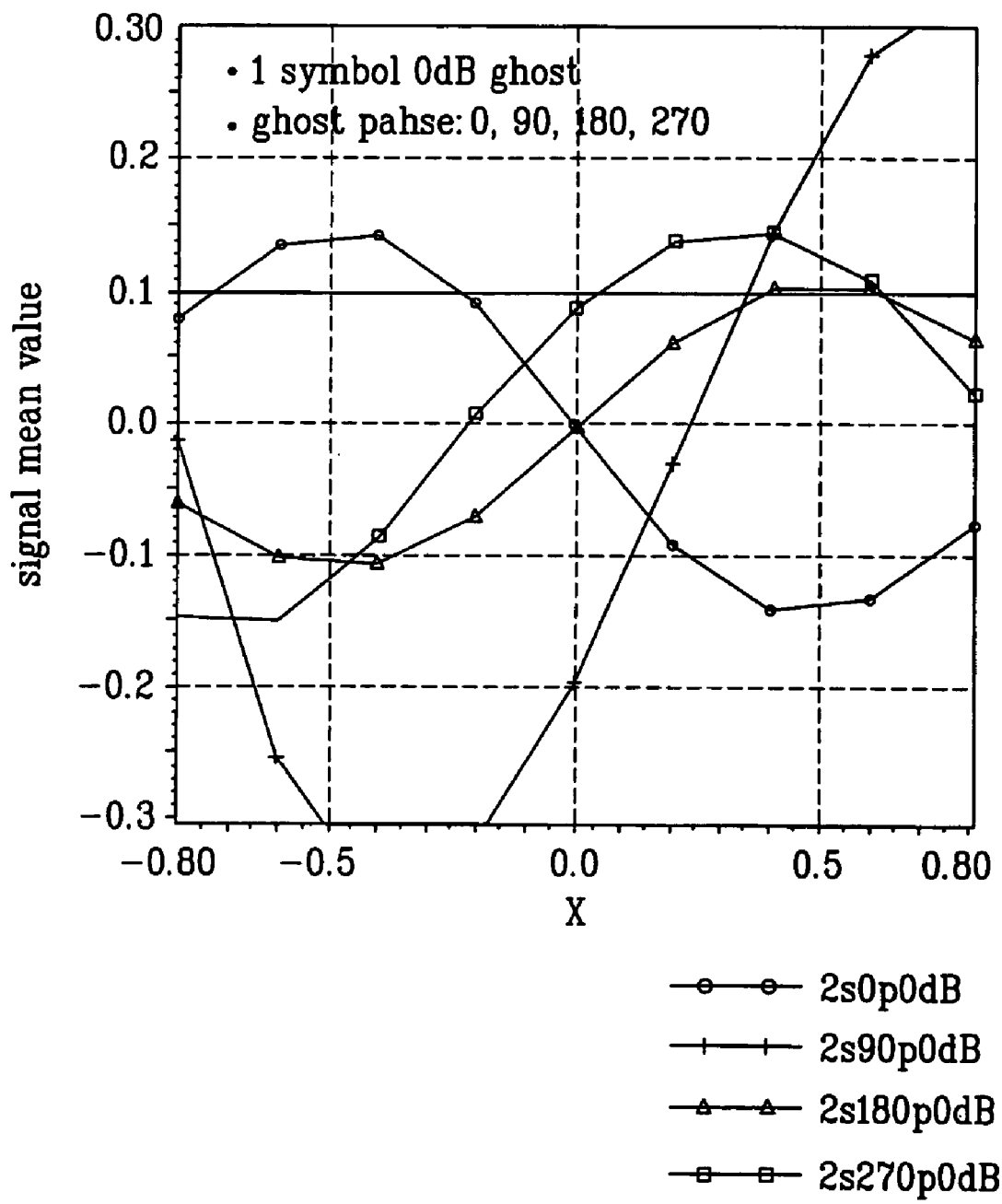
FIGS. 9A and 9B are graphs illustrating an average gain (S-curve) characteristic of a timing recovery according to the present invention.
Figure 9B:
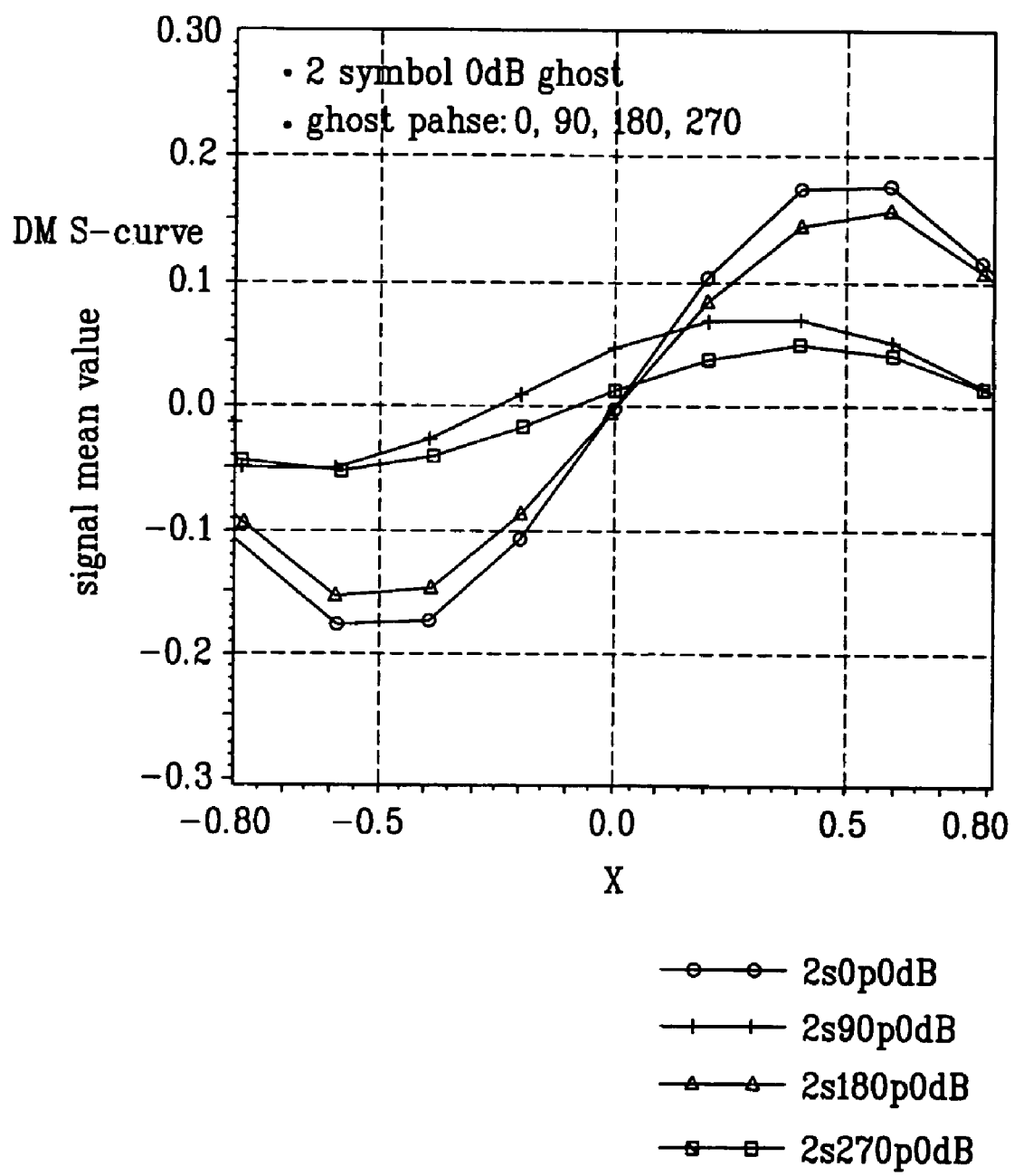

FIGS. 9A and 9B are graphs illustrating an average gain (S-curve) characteristic of a timing recovery according to the present invention.

Since the timing recovery of the present invention extracts timing information using a signal distribution, an average gain (S-curve) is not seriously faded for a specific ghost.

Since the present invention extracts timing information using the whole-band of received spectrum, performance of the timing recovery does not depend on a specific frequency portion, so that even in case that a null close to 0 dB is generated at a predetermined portion of the spectrum in a frequency selective fading channel such as a multi-path channel, a performance can be maintained.

Figure 10A:
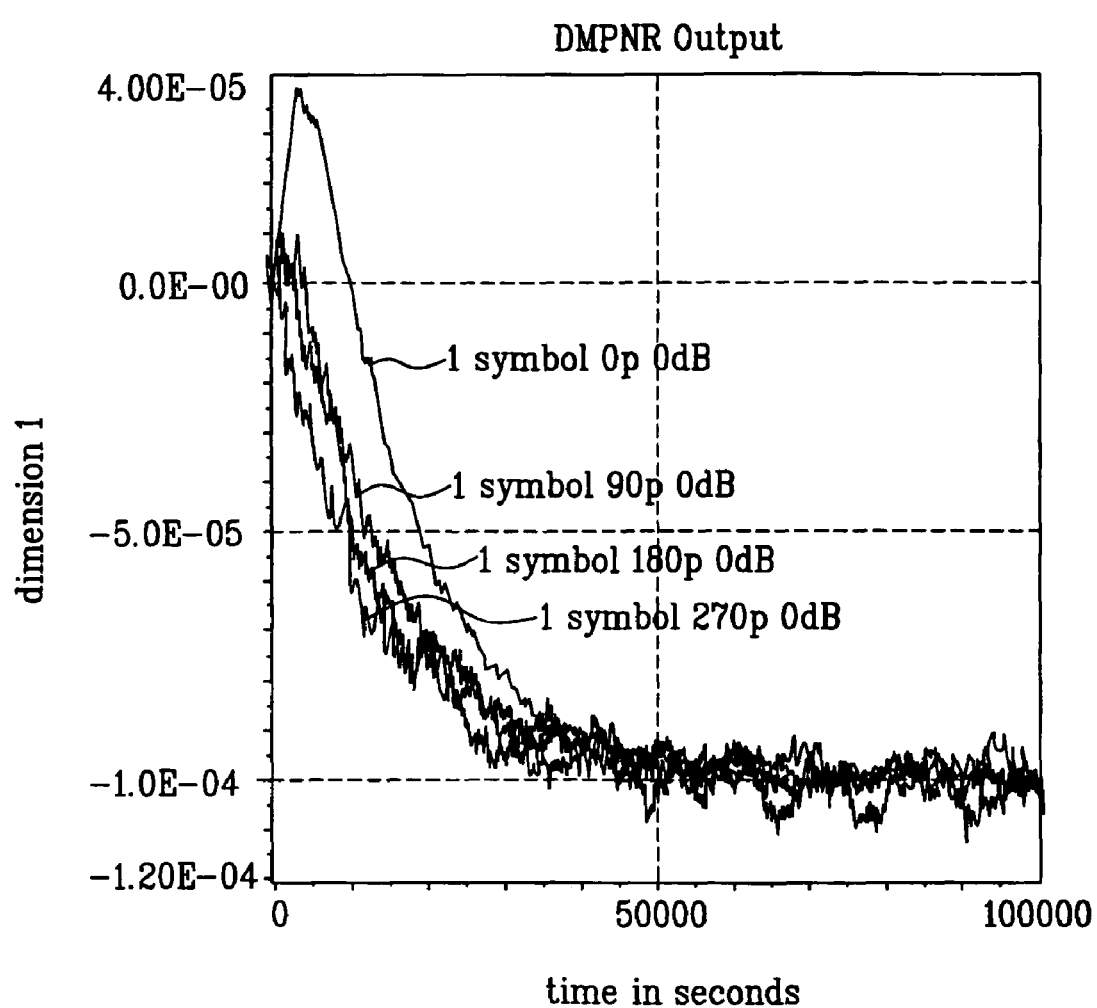
FIGS. 10A and 10B are graphs illustrating simulation results of a convergence characteristic of a timing recovery loop according to the present invention.
Figure 10B:
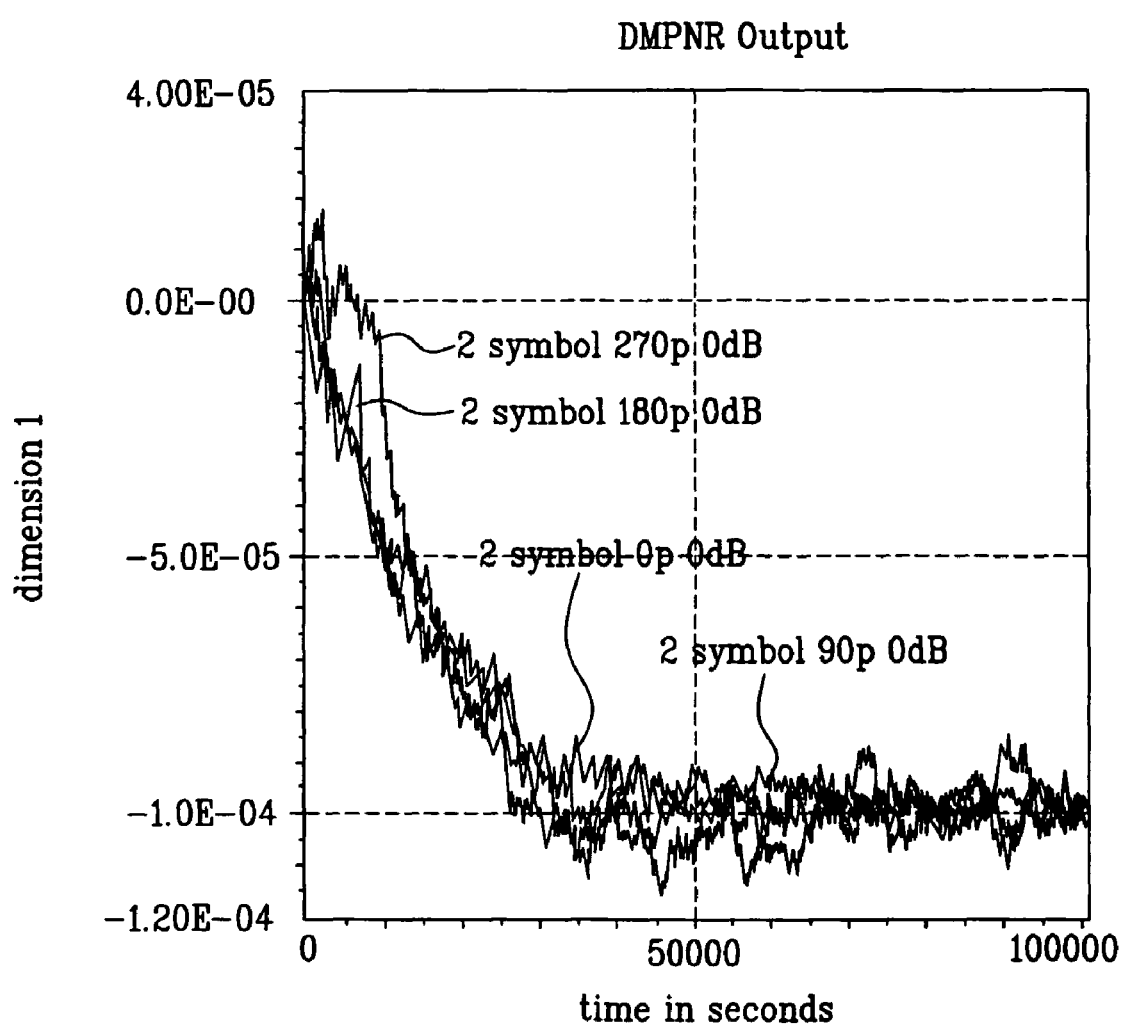

FIGS. 10A and 10B are graphs illustrating simulation results of a convergence characteristic of the timing recovery loop in which an influence of a jitter by carrier recovery is ignored and an initial timing offset that corresponds to about 0.0001 times a sampling frequency is forcibly given.

Referring to FIGS. 10A, and 10B, even in case there exist 1 symbol delay 0 degree 0 dB ghost or 2 symbol delay 180 degree 0 dB ghost, the symbol timing recovery converges to an initial timing offset, which shows that the symbol timing recovery of the present invention can stably capture a timing error for all frequency components.

Since the present invention estimates a timing offset in such a way that a dispersion constant is minimized, the pre-filter is not used before a timing offset is detected.

Therefore, since the performance of the symbol timing recovery does not depend on a specific frequency portion, a stable timing error capture can be realized in a frequency selective fading channel such as a multi-path channel.

If the carrier recovery is not completed, the dispersion constant used as a reference for a timing error, is influenced. Presuming that there exists a predetermined residual carrier phase offset, since a constellation of a DMTED input signal is rotated as much as the residual carrier phase offset, a change in the dispersion constant is caused regardless of the timing error, which is an undesirable phenomenon and resultantly a performance of the symbol timing recovery comes to depend on a performance of the carrier recovery. For an additional device for compensate for such disadvantages, a residual carrier phase recovery circuit using a dispersion constant can be used.

Figure 11:
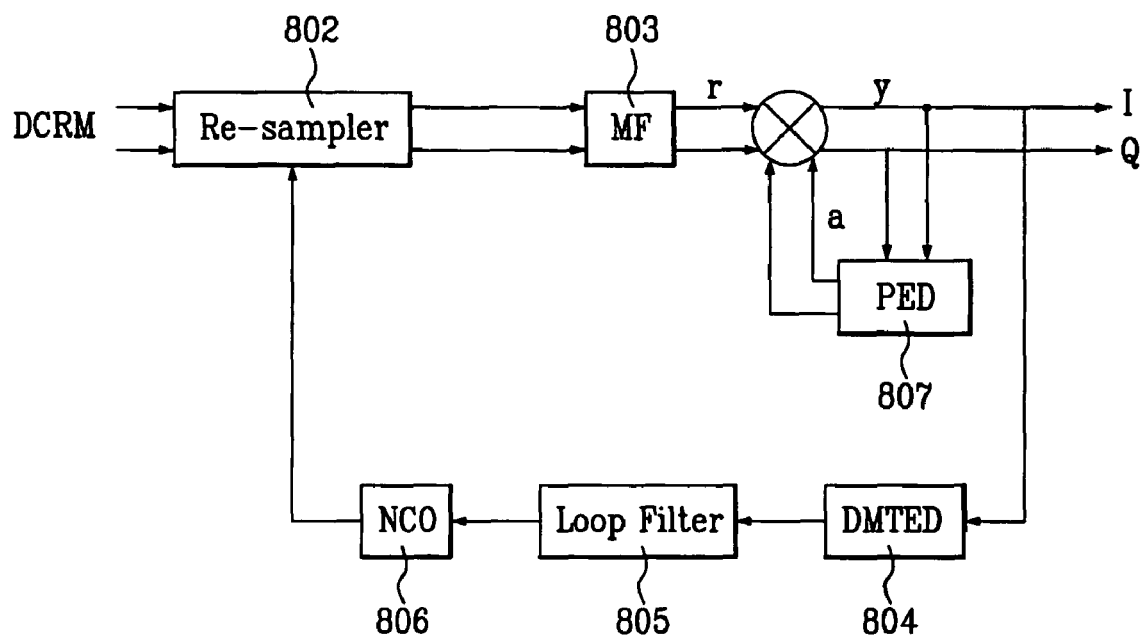
FIG. 11 is a block diagram of a timing recovery including a residual carrier recovery according to the present invention.

FIG. 11 is a view illustrating the symbol timing recovery to which the residual carrier phase recovery is added according to the present invention. FIG. 11 is the same as FIG. 8 except that the carrier phase recovery 807 is added between the MF and the DMTED.

The PED 807 helps the DMTED to extract only a timing error by removing a residual carrier phase offset from an output signal of the MF.

As described above, since a dispersion constant increases by a carrier phase offset, it is possible to estimate a residual carrier phase in such a way that a DM cost function is minimized.

The DMTED including the residual carrier recovery using the DM cost function as a cost function can be constructed as follows. Firstly, presuming that a signal that has passed through the MF and is inputted to the complex multiplier is rk and an output signal of the complex multiplier is yk, a cost function for minimizing a dispersion constant is given by the equation 4:

$$J(\tau,\alpha)=E\{(|\text{real}(\alpha r_k(\tau))|^2-\gamma)^2\}=E\{(|y_i|^2-\gamma)^2\},$$
$$\gamma=E\{|s|^2\}/E\{|s|^2\} \quad \text{Equation 4}$$

$\alpha=\alpha_i+j\alpha_q$
$r=r_j+jr_q$
$y=y_i+jy_q=(r_i\alpha_i-r_q\alpha_q)+j(r_i a_q+r_q\alpha_i)$ By applying a stochastic gradient algorithm, $\alpha$ and timing offset $\tau$ for minimizing a cost function $J(\tau,\alpha)$ can be obtained by the following equation 5:

$$\alpha_{k+1} = \alpha_k - \mu(|y_i|^2 - \gamma)y_i \frac{\partial y_i}{\partial \alpha}$$
$$= \alpha_k - \mu(|y_i|^2 - \gamma)y_i(r_i - jr_q).$$
$$\tau_{k+1} = \tau_k - \mu(|y_i|^2 - \gamma)y_i \frac{\partial}{\partial \tau_k} y_i$$
$$= \tau_k - \mu(|y_i|^2 - \gamma)y_i\left(\alpha_i \frac{\partial}{\partial \tau_k}r_i - \alpha_q \frac{\partial}{\partial \tau_k}r_q\right),$$

Equation 5

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A timing recovery comprising:
   a resampler configured to receive a sampling timing control signal according to timing offsets of current symbols as feedback and control a sampling timing of a complex signal input from a carrier recovery;
   a DMTED (dispersion minimization timing error detector) configured to receive the sampling timing control signal from the resampler, apply a dispersion constant as a cost function of a CM (constant modulus) algorithm, and estimate timing offset information such that the dispersion constant is reduced by using the CM algorithm, wherein the dispersion constant is obtained by raising the sampling timing control signal to a fourth power and the dispersion constant is estimated by changing a timing offset;

a loop filter configured to filter only a low band signal component in the estimated timing offset information output from the DMTED; and a complex oscillator configured to feed the sampling timing control signal back to the resampler for controlling the sampling timing of the resampler by changing an output frequency depending on the low band signal component of the estimated timing offset information.

2. The timing recovery of claim 1, further comprising:

a DC (direct current) remover at a front end of the resampler configured to remove a DC component of a complex signal input from the carrier recovery.

3. The timing recovery of claim 1, further comprising:

a matching filter at a next end of the resampler configured to match the complex signal whose sampling-timing has been controlled at the resampler.

4. The timing recovery of claim 3, wherein the DMTED estimates timing offset information using both a real component and an imaginary component of symbols output from the matching filter.

5. The timing recovery of claim 3, wherein the DMTED estimates timing offset information using only a real component of symbols output from the matching filter.

6. The timing recovery of claim 3, wherein the matching filter is a square-root-raised-cosine filter.

7. The timing recovery of claim 3, wherein the DMTED estimates timing offset information capable of reducing a dispersion constant by applying the following equation:

$$\tau_{k+1} = \tau_k - \mu(|y_k(\tau_k)|^2 - \gamma T)y_k \frac{\partial}{\partial \tau_k} y_k(\tau_k),$$

where,
$\mu$: step size $\tau_{k+1}, \tau_k$: timing offset
$y_k(\tau_k)$: output of matching filter
$\gamma_T$: dispersion constant of original symbols.

8. The timing recovery of claim 7, wherein the DMTED is configured such that its convergence speed and its MSE (mean square error) in a normal state are determined depending on the step size $\mu$.

9. The timing recovery of claim 7, wherein the DMTED is configured such that its convergence speed gets fast and a residual MSE in the normal state is increased as the step size $\mu$ becomes large, while its convergence speed gets slow and the residual MSE is reduced as the step size $\mu$ becomes small.

10. A timing recovery, comprising:

a DC (direct current) remover configured to remove a DC component of a complex signal input from a carrier recovery;

a resampler configured to receive a sampling timing control signal according to timing offsets of current symbols as feedback and control a sampling timing of the complex signal from which the DC component has been removed;

a DMTED (dispersion minimization timing error detector) configured to receive the sampling timing control signal from the resampler, apply a dispersion constant as a cost function of a CM (constant modulus) algorithm, and estimate timing offset information such that the dispersion constant is reduced by using the CM algorithm, wherein the dispersion constant is obtained by raising the sampling timing control signal to a fourth power;

a loop filter configured to filter only a low band signal component in the estimated timing offset information output from the DMTED; and a complex oscillator configured to feed the sampling timing control signal back to the resampler for controlling the sampling timing of the resampler by changing an output frequency depending on the low band signal component of the estimated timing offset information.

* * * * *